(12) United States Patent
Khan et al.

(10) Patent No.: US 12,306,808 B2
(45) Date of Patent: May 20, 2025

(54) LIVE DATA MIGRATION SYSTEM

(71) Applicant: Snap Inc., Santa Monica, CA (US)

(72) Inventors: Ovais Ahmad Khan, Woodinville, WA (US); James Daniel Baird, Seattle, WA (US); Tittu Jose, Sammamish, WA (US); David Andrew Killian, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 572 days.

(21) Appl. No.: 17/565,861

(22) Filed: Dec. 30, 2021

(65) Prior Publication Data

US 2022/0207003 A1     Jun. 30, 2022

Related U.S. Application Data

(60) Provisional application No. 63/132,259, filed on Dec. 30, 2020.

(51) Int. Cl.
    *G06F 16/21*        (2019.01)
    *G06F 16/23*        (2019.01)

(52) U.S. Cl.
    CPC ........ *G06F 16/214* (2019.01); *G06F 16/2379* (2019.01)

(58) Field of Classification Search
    CPC ............................ G06F 16/214; G06F 16/2379
    See application file for complete search history.

(56) References Cited

U.S. PATENT DOCUMENTS

| | | | | |
|---|---|---|---|---|
| 9,043,640 B1 * | 5/2015 | Havemose | .......... | G06F 11/1497 707/610 |
| 9,251,004 B1 * | 2/2016 | Havemose | .......... | G06F 9/44505 |

(Continued)

FOREIGN PATENT DOCUMENTS

| | | | |
|---|---|---|---|
| CN | 116685960 A | 9/2023 | |
| EP | 3680789 A1 * | 7/2020 | ........... G06F 16/213 |
| WO | WO-2022147229 A1 | 7/2022 | |

OTHER PUBLICATIONS

"International Application Serial No. PCT/US2021/065657, International Search Report mailed Apr. 28, 2022", 4 pgs.
"International Application Serial No. PCT/US2021/065657, Written Opinion mailed Apr. 28, 2022", 4 pgs.

(Continued)

*Primary Examiner* — Md I Uddin
*Assistant Examiner* — Jessica N Le
(74) *Attorney, Agent, or Firm* — Schwegman Lundberg & Woessner, P.A.

(57) ABSTRACT

Systems, methods, and computer readable media for a live data migration system where the methods include accessing a command to perform a live data migration of a source datastore to a target datastore, accessing a delete operation, the delete operation indicating first data to be deleted from a datastore, and determining the datastore is stored in a source datastore. The methods further includes performing a two-phase commit delete of the first data from the source datastore and the target datastore, accessing a write operation, the write operation indicating second data, and performing a two-phase commit write of the second data to the source datastore and to the target datastore. The methods further include copying the source datastore to the target datastore, accessing a read operation, the read operation indicating third data to be read from the datastore, and performing the read operation of the third data from the target datastore.

17 Claims, 15 Drawing Sheets

(56) References Cited

U.S. PATENT DOCUMENTS

| | | | |
|---|---|---|---|
| 9,336,099 B1* | 5/2016 | Havemose | G06F 11/1482 |
| 10,671,545 B2* | 6/2020 | Tarasuk-Levin | G06F 12/1408 |
| 10,997,132 B2* | 5/2021 | Shivam | G06F 16/214 |
| 11,240,302 B1* | 2/2022 | Callau | G06F 3/0604 |
| 11,423,047 B2* | 8/2022 | Ofenloch | G06F 16/162 |
| 11,782,906 B2* | 10/2023 | Khan | H04L 67/1097 |
| | | | 707/703 |
| 11,789,922 B1* | 10/2023 | Jain | G06F 3/0604 |
| | | | 707/703 |
| 11,853,321 B1* | 12/2023 | Kumar | G06F 3/0617 |
| 11,966,304 B1* | 4/2024 | Havemose | G06F 11/1482 |
| 2010/0071025 A1* | 3/2010 | Devine | G06F 9/4856 |
| | | | 718/1 |
| 2011/0041006 A1* | 2/2011 | Fowler | G06F 9/466 |
| | | | 714/E11.131 |
| 2013/0290661 A1* | 10/2013 | Reuther | G06F 3/0647 |
| | | | 711/162 |
| 2017/0351702 A1 | 12/2017 | Schaefer et al. | |
| 2018/0365104 A1* | 12/2018 | Huang | H03M 13/373 |
| 2018/0373553 A1* | 12/2018 | Connor | G06F 9/45558 |
| 2019/0213270 A1* | 7/2019 | Taubler | G06F 16/27 |
| 2019/0266169 A1* | 8/2019 | Sardina | G06F 16/2453 |
| 2020/0401575 A1* | 12/2020 | Olstad | G06F 16/2343 |
| 2021/0382636 A1* | 12/2021 | Perumal | G06F 3/0622 |
| 2022/0050809 A1* | 2/2022 | Lu | G06F 16/162 |

OTHER PUBLICATIONS

Brodie, Michael L, "Darwin: On the Incremental Migration of Legacy Information Systems", Distributed Object Computing Group, Technical Report TR-0222-10-92-165, GTE Labs Inc, 28, [Online] Retrieved from the Internet: <URL: https://citeseerx.ist.psu.edu/viewdoc/download?doi=10.1.1.70.2950&rep=rep1&type=pdf>, (Mar. 1993), 59 pgs.

"International Application Serial No. PCT/US2021/065657, International Preliminary Report on Patentability mailed Jul. 13, 2023", 6 pgs.

* cited by examiner

| PARTITION KEY | REMAINING KEY | VALUE |
|---|---|---|
| USERA | ~ | [TRANSACTIONMETADATA:NONE]; VERSION=1 |
| USERA | USERB | TYPE:NIL |
| USERA | USERC | TYPE:FRIEND_REQUEST_SENT |
| USERA | USERD | TYPE:FOLLOW |
| USERA | ~ | [TRANSACTIONMETADATA:NONE]; VERSION=1 |
| USERA | USERB | TYPE: NIL |
| USERA | USERC | TYPE:FRIEND_REQUEST_SENT |
| USERA | USERD | TYPE:FOLLOW |

FIG. 11

| | SOURCE DATASTORE 606 | | | | TARGET DATASTORE 604 | | | | |
|---|---|---|---|---|---|---|---|---|---|
| | | METADATA 1211 | | | | METADATA 1218 | | | |
| 1202 OPERATION | 1208 ROLE | 1209 VERSION | 1210 STATE | 1212 MUTATIONS | 1214 USERA /USERC:TYPE | 1216 ROLE | 1217 VERSION | 1219 TRANSACTION | 1220 USERA /USERC:TYPE |
| 1002 | LEADER | 1 | NIL | NIL | | FOLLOWER | 10 | NIL | |
| 1004 | LEADER | 1 | NIL | NIL | | FOLLOWER | 10 | NIL | |
| 1006 | LEADER | 1 | PREPARING | S:UserA.type=Friend; T:UserA.type=Friend | | FOLLOWER | 10 | NIL | |
| 1008 | LEADER | 1 | PREPARING | S:UserA.type=Friend; T:UserA.type=Friend | FRIEND | FOLLOWER | 10 | Locked: S:USERA | |
| 1010 | LEADER | 2 | COMMITTED | S:UserA.type=Friend; T:UserA.type=Friend | FRIEND | FOLLOWER | 10 | Locked: S:USERA | |
| 1012 | LEADER | 2 | COMMITTED UNAPPLIED | S:UserA.type=Friend; T:UserA.type=Friend | FRIEND | | 11 | NIL | FRIEND |
| 1014 | | 2 | NIL | NIL | | | 11 | NIL | FRIEND |

*FIG. 12*

LIVE DATA MIGRATION SYSTEM

PRIORITY

This application claims the benefit of priority of U.S. patent application Ser. No. 63/132,259, filed on Dec. 30, 2020, which is hereby incorporated by reference in its entirety

TECHNICAL FIELD

Examples of the present disclosure relate generally to live data migration between two datastores or databases. More particularly, but not by way of limitation, examples of the present disclosure relate to a live data migration system that migrates data from a source datastore or database to a destination datastore or database using cross store transactions with two-phase commit.

BACKGROUND

Datastores or databases servicing online applications often cannot simply be shut down without incurring significant expense. Often the online applications need to be continuously available with no downtime. However, the datastores or databases may need to be moved to different datastores or databases. The data may include photos, videos, AR/MR icons, and other types of media content items. Additionally, these types of data are susceptible to data corruption or data loss, which can result in system failures or a failure to properly provide storage facilities to the user of the online applications.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 11 illustrates partitions, in accordance with some examples.

FIG. 12 is a flowchart for a method, in accordance with some examples.

DETAILED DESCRIPTION

Figure 1:
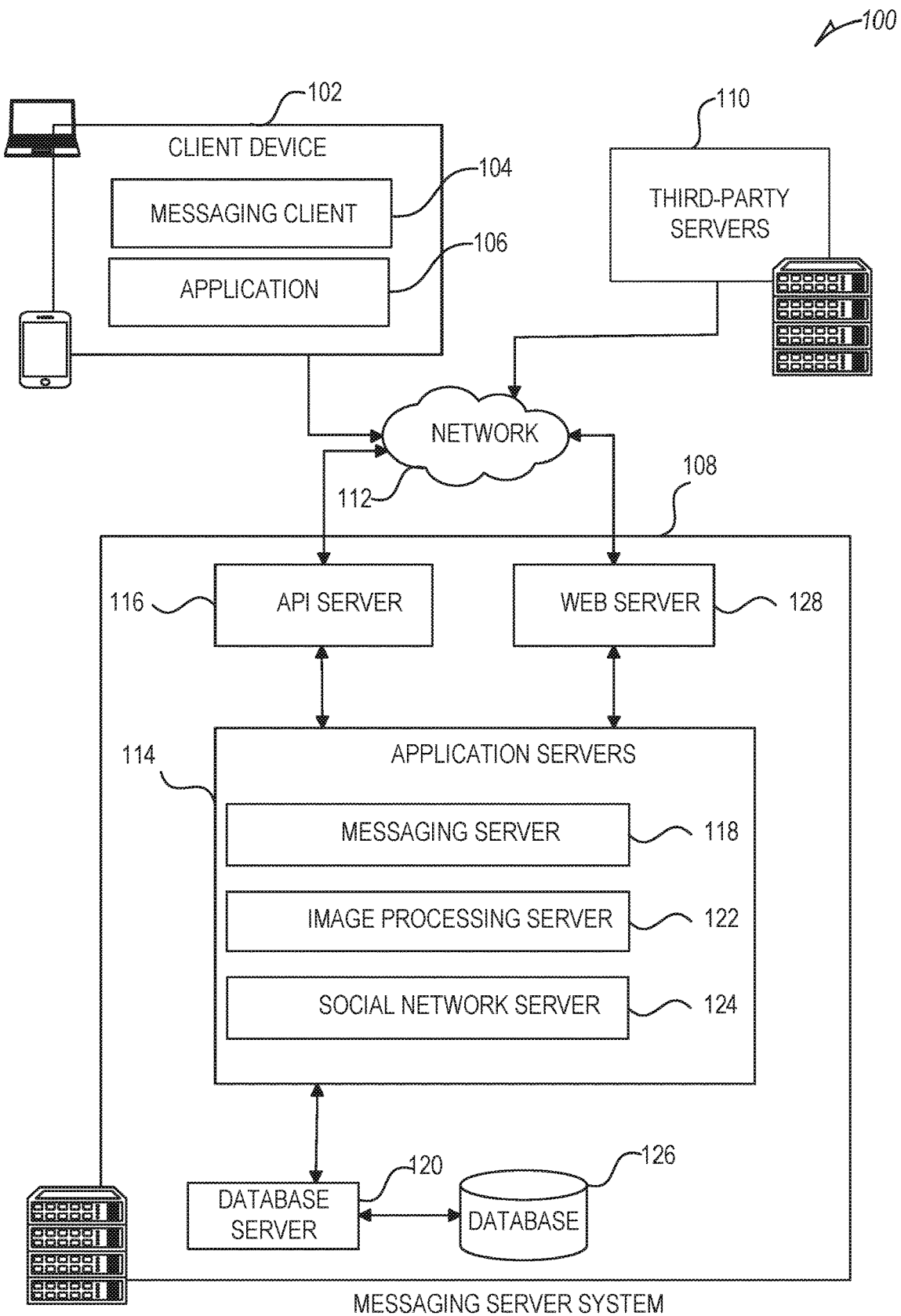
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

In current data migration systems, the application server and associated source and target devices are designated offline while migrating data from one storage system to another storage system. Data migration typically occurs when new storage systems have been installed or an abundant amount of data has been uploaded in one storage system but needs to be moved to another more secure storage system. Current migration systems incur significant downtime during migration and require processing of frequent code and configuration changes. Migration systems at the application layer do not scale well and result in excessive computing processing when investigating mismatches in data copying, reading, and writing.

A technical problem is how to perform a live migration of data stored in a source datastore to a target datastore. Some examples address the technical problem where a live migration system is provided that executes a live data migration operation in a cross datastore OF database distributed data transaction network between two or more computing devices utilizing a dual delete and dual writing migration process where the dual delete and dual writing are performed by a two-phase commit. A data migration system is enabled to migrate cross partition key transactions, reduce the number of processing rounds between the source and target database, eliminate the need for code and configuration changes at the application server level, and process automatic rollbacks in order to prevent production processing data issues.

The data migration system includes subsystem components that execute various states during the live data migration operation, such as a two-phase commit subsystem, a migration subsystem, and a validation subsystem. Additionally, the live data migration system engages with the data migration in a stepwise fashion where a percentage of operations directed to the datastore are performed and the percentage is slowly increased while ensuring that data is being processed properly and that a latency threshold for accessing the datastores is not transgressed. Moreover, in some examples, a distributed two-phase commit is used for the dual reading, writing, and deleting. Thus, a live data migration system may be used where the system can maintain acceptable levels of service to application programs accessing the data in the datastores.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
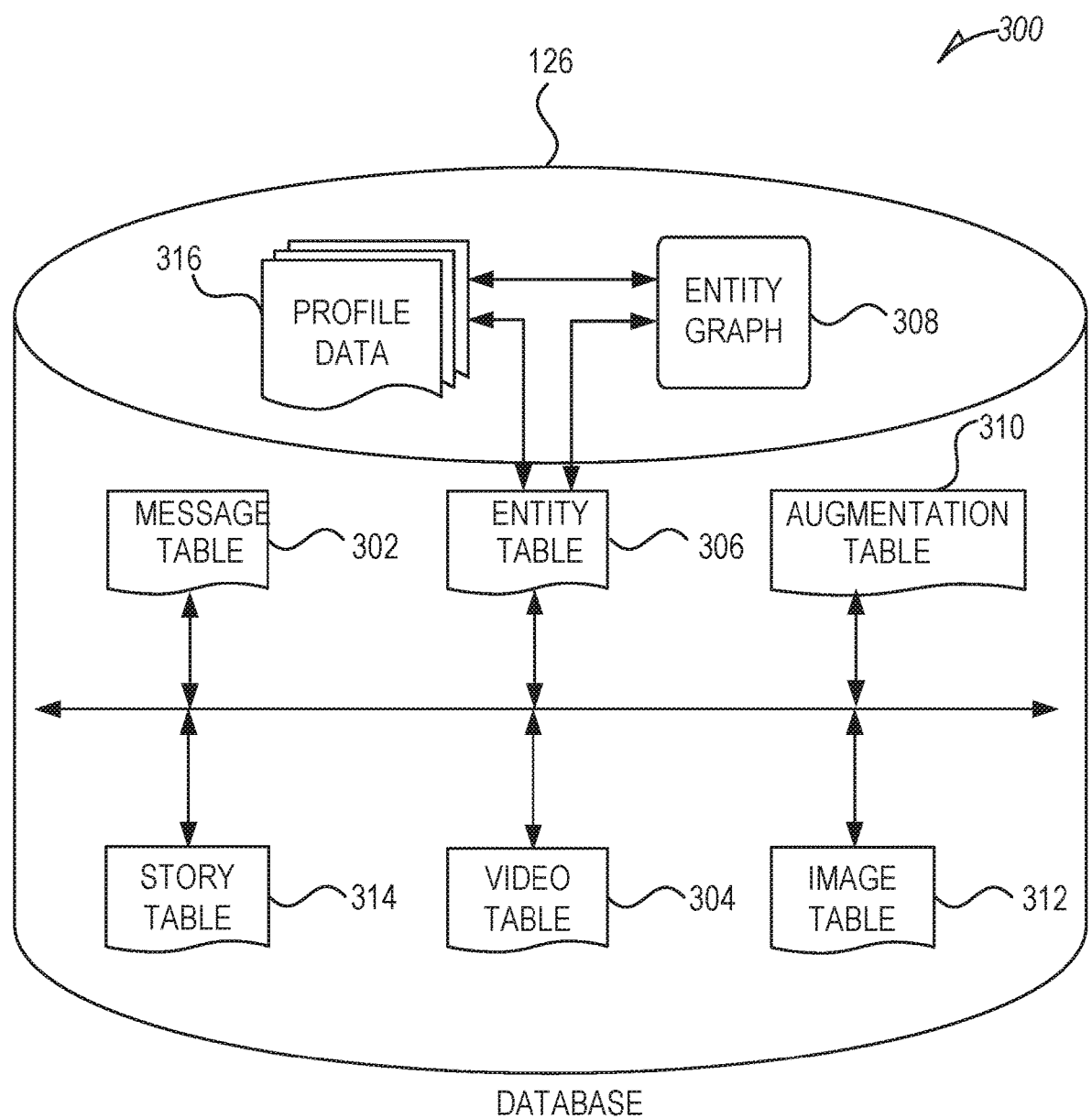
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a.*ml file), an applet may incorporate a scripting language (e.g., a.*js file or a .json file) and a style sheet (e.g., a.*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110, for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
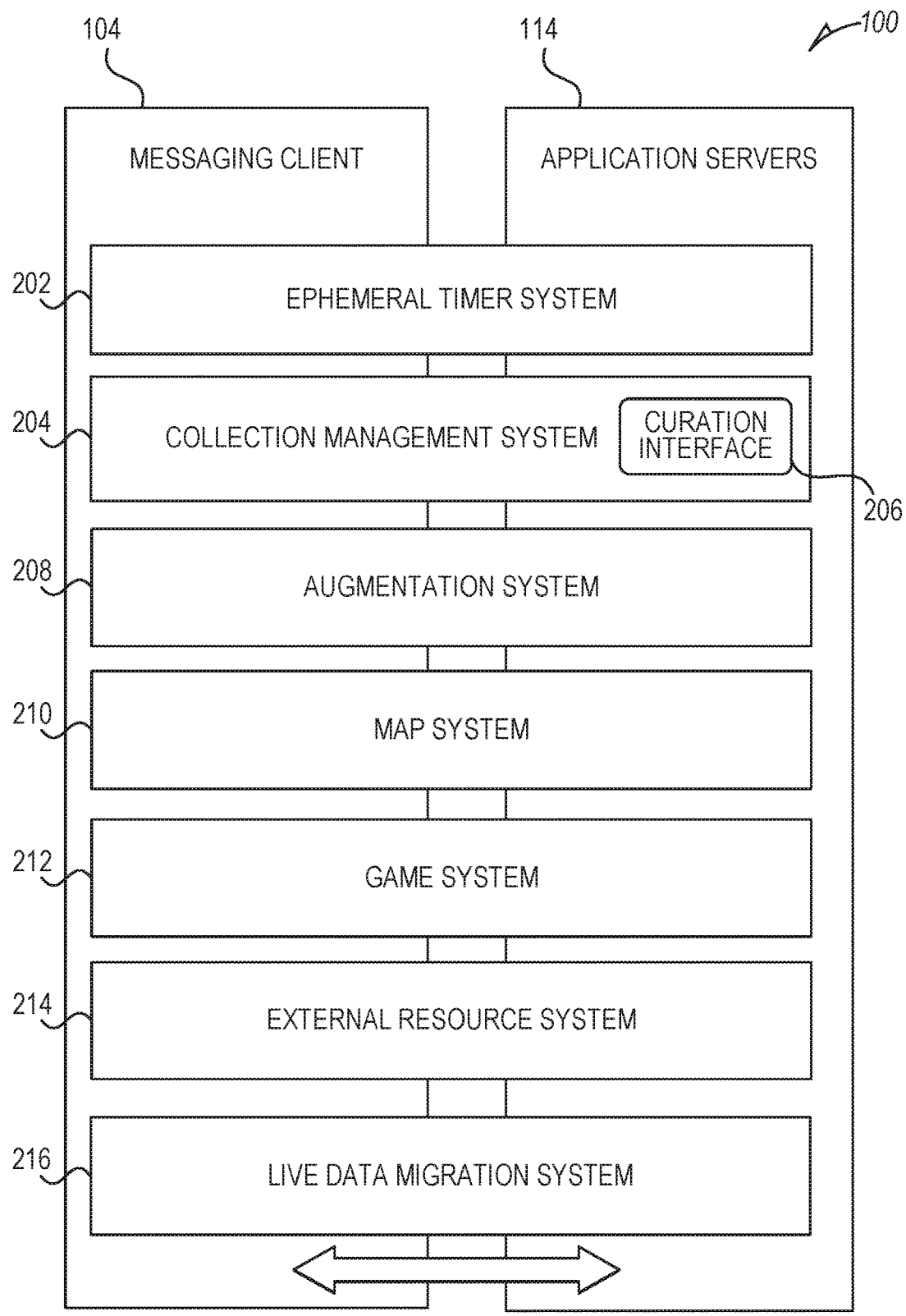
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and an interaction system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

in other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104.

The messaging client 104 also supports both voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML-5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The live data migration system 216 provides functions and routines for performing live data migration between two or more datastores. The live data migration system 216 provides the functions and routines as described herein and in FIGS. 6-12. The live data migration system 216 enables migrating data between a source datastore and a destination datastore while continuing to provide an acceptable level of service to application programs accessing the data stored in the source datastore. The middleware layer module 614 is configured to migrate data from a source datastore 604 to a target datastore 606 while continuing to service application programs 608, 610.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
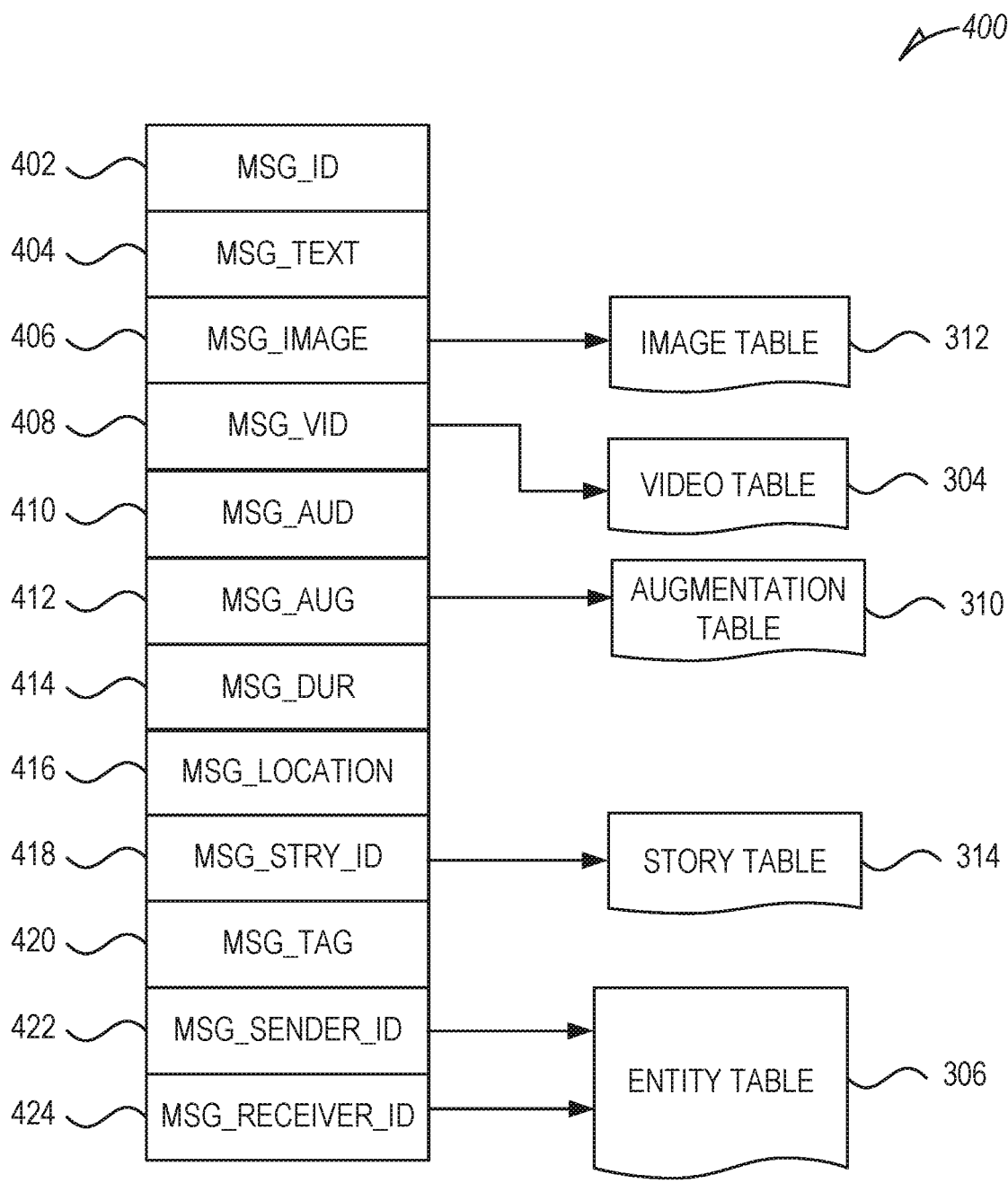
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
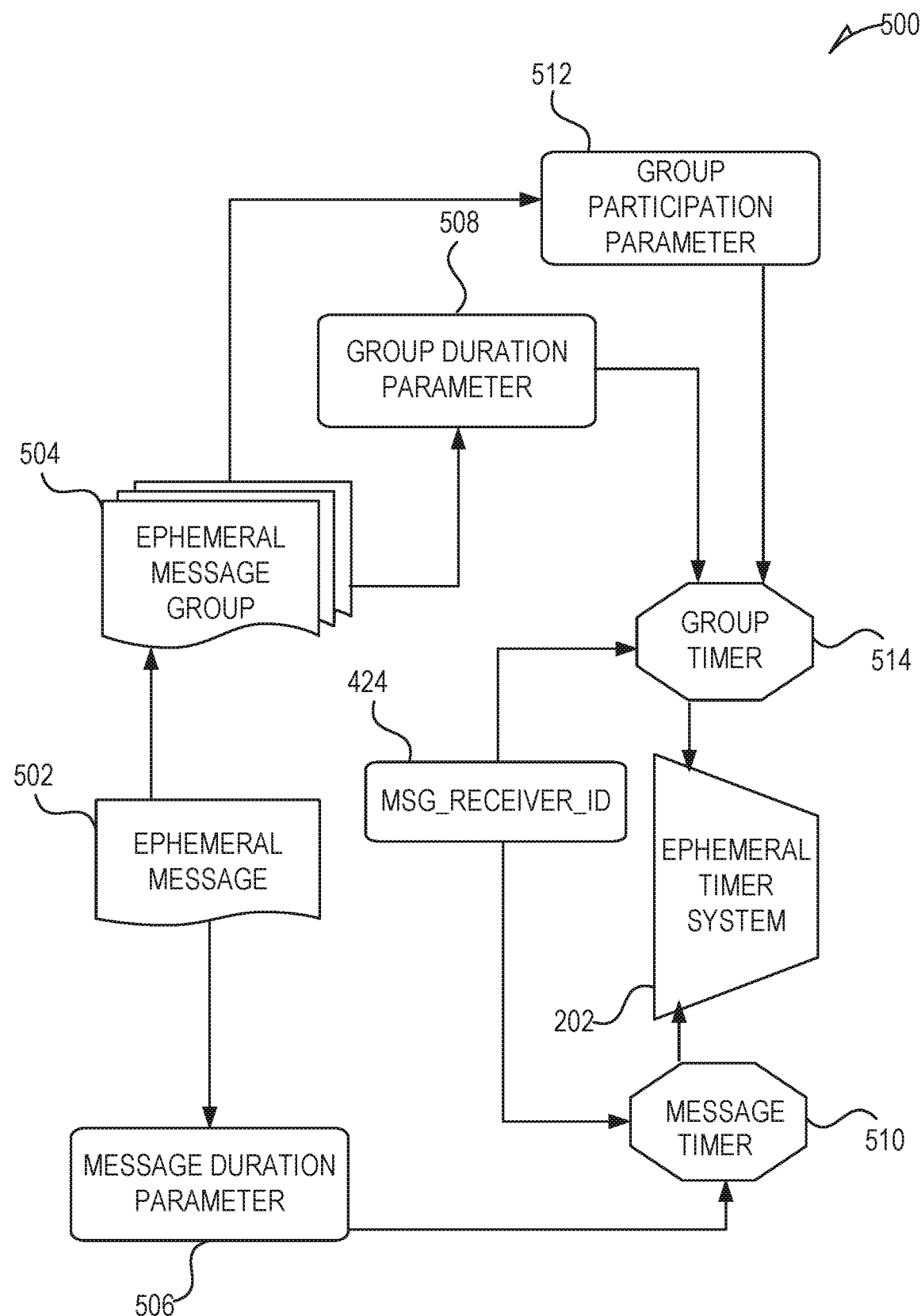
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Live Data Migration System

Figure 6:
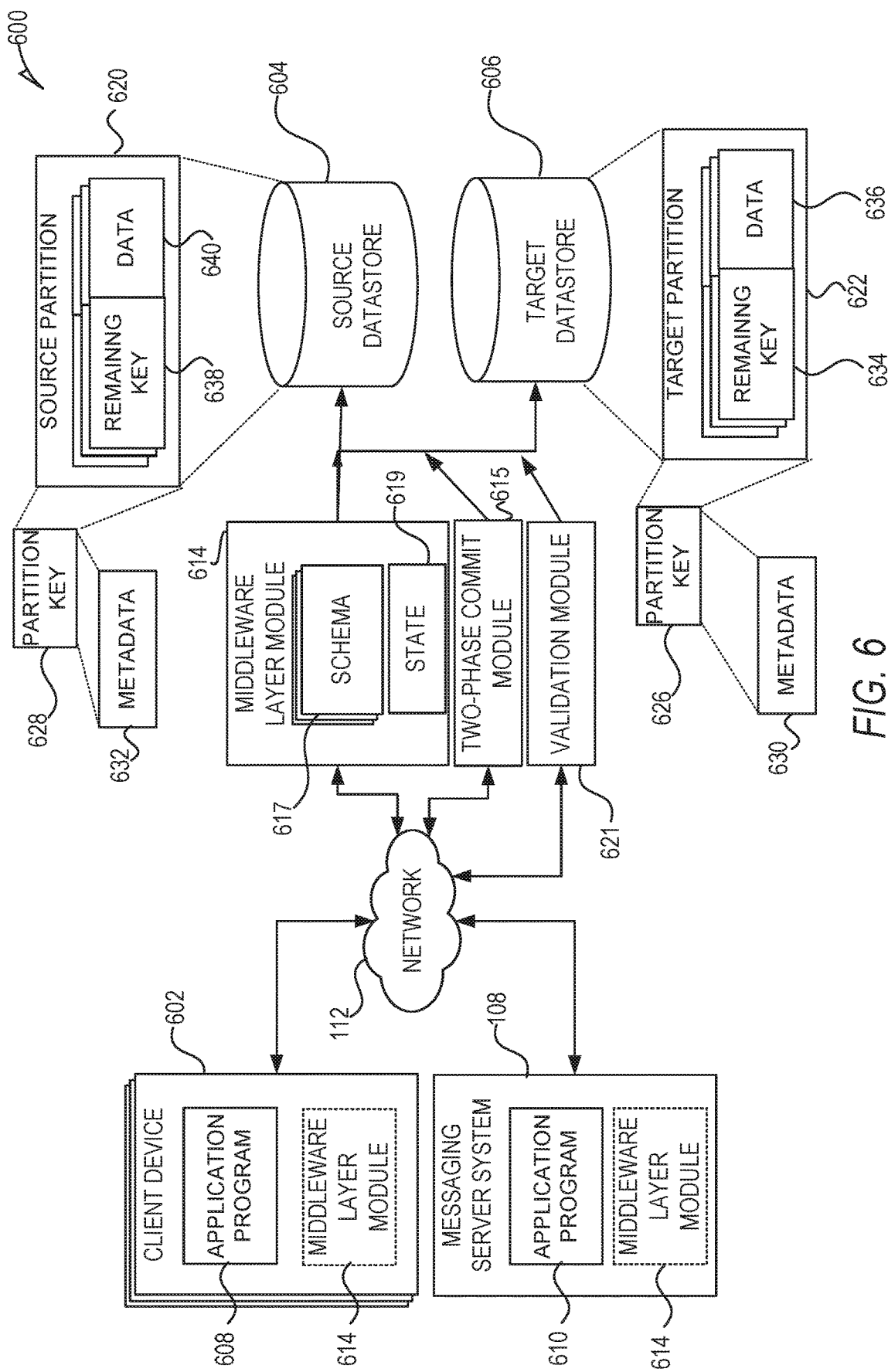
FIG. 6 illustrates a live data migration system, in accordance with some examples.

FIG. 6 illustrates a live data migration system 600, in accordance with some examples. Client devices 602 is the same or similar as client device 102. The application programs 608, 610 reside or run on a client device 602, a messaging server system 108, or another computing device. The application programs 608, 610 access the source database and the target datastore 126 via the network 112 and the middleware layer module 614.

The middleware layer module 614 is configured to perform the live data migration. For example, middleware layer module 614 is configured to perform method 700. Middleware layer module 614 includes schema 617 for the source datastore 604 and target datastore 606. In some examples, the middleware layer module 614 is configured to take data access commands from the application programs 608, 610 and convert them to an appropriate command for the schema 617 of the source datastore 604 or the target datastore 606. For example, an application program 608, 610 sends a read command to the middleware layer module 614 and the middleware layer module 614 determines where the data resides based on the information within the read command and may format the read command in accordance with a schema 617 for the datastore such as the source datastore 604. For example, the read command may include a reference to "user table: surname" and the middleware layer module 614 may determine that the "user table" resides in the source datastore 604 and that it has a schema 617 with "surname" being mapped to "last name". The middleware layer module 614 may be centralized or distributed. The application programs 610 are configured to access the source datastore 604 and the target datastore 606 via the middleware layer module 614.

In some examples the applications of the application servers 114 use two-phase commit modules 615 and/or the middleware layer module 614. In some examples the messaging client 104, application 106 and other applications use the two-phase commit modules 615 and/or the middleware layer module 614. In some examples all applications, e.g., the systems of FIG. 2, that access data of the messaging server system 108 or third-party servers 110 use the two-phase commit modules 615 and/or middleware layer module 614 to ensure data consistency. In some examples the database server 120 ensures that applications accessing the database 126 or other data use the two-phase commit method and/or middleware layer module 614 disclosed herein.

in some examples, the application programs 608, 610 are compiled so that the code for middleware layer module is included within the code. In some examples, the application programs 608, 610 make calls to run-time libraries to invoke the functions necessary to perform the functions of the middleware layer module 614. The middleware layer module 614 is depicted as optional because there may not be an actual module but either included code for accessing or migrating the datastores commit or run-time calls to access or migrate the datastores. The middleware layer module 614 may be decentralized so that each of the application programs 608, 610 are not invoking or calling a centralized module to access data in the source datastore 604 or target datastore 606. In some examples, the middleware layer module 614 resides on a server and is accessed by the application programs 608, 610 via calls to access the source datastore 604 or target datastore 606. The middleware layer module 614 includes a state 619 that indicates a state of a data migration. For example, state 619 indicates one of the states discussed in conjunction with FIG. 8. The validation module 621 performs validation for the target datastore 606 as discussed in conjunction with FIG. 7.

Two-phase commit module 615 provides a two-phase commit functionality. The two-phase commit includes changing the values of at least two fields within a source datastore 604 or target datastore 606 where it is guaranteed that either both values will be changed or neither value will be changed. The two-phase commit module 615 may be distributed or centralized. The two-phase commit module 615 may be decentralized so that each of the application programs 608, 610 are not invoking or calling a centralized module to perform a two-phase commit on data.

The source partition 620 and target partition 622 are stored in the source datastore 604 and target datastore 606, respectively. The partition keys 628, 626 are partition keys that may include a property or path to the source partition 620 and target partition 622, respectively. For example, the partition keys 628, 626 may be a JavaScript Object Notation (JSON) property that includes a data path. The partition keys 628, 626 identify one or more data objects. In some examples, the partition keys 628, 626 consist of one or more columns that determine the partition where each row is stored.

The partition keys 628, 626 define some subset of data objects or entities and may be used to access the data objects or entities. The remaining keys 638, 634 are used to access the data 640, 636, respectively. The metadata 632, 630 is used to perform the two-phase commit or live data migration by the middleware layer module 614 and/or the two-phase commit module 615. The metadata 632, 630 is associated with the partition keys 628, 626 as illustrated but may be stored differently.

Figure 7:
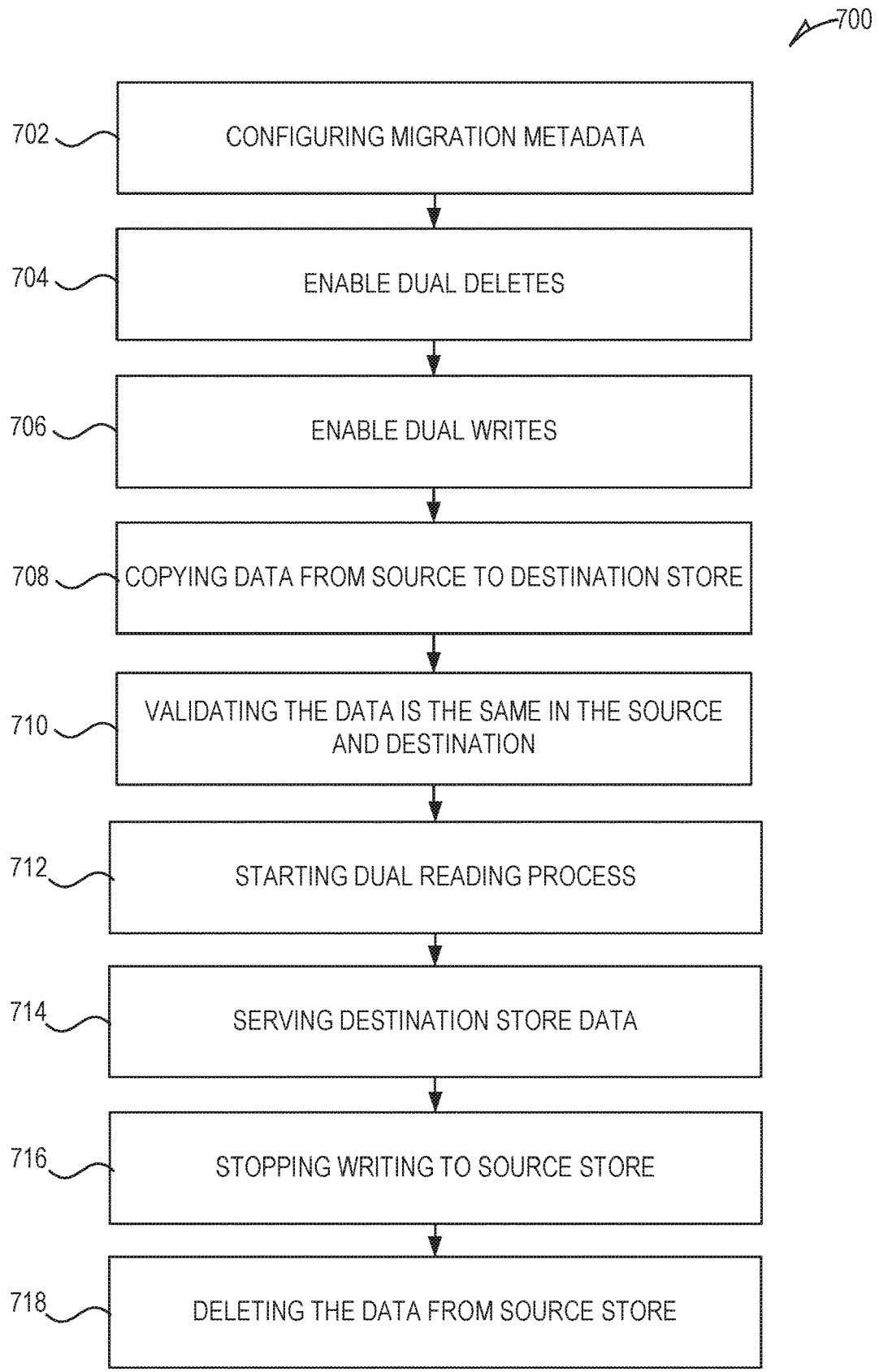
FIG. 7 illustrates a method of live data migration, in accordance with some examples.

FIG. 7 illustrates a method 700 of live data migration, in accordance with some examples. The method 700 begins with configuring migration metadata. For example, Table 1 illustrates schemas 617 for the source datastore 604 and the target datastore 606. The schemas 617 may be stored associated with middleware layer module 614. In some examples, the schemas are handcrafted by a human being. In some examples, the target database schema is automatically generated by the middleware layer module 614. In Table 1 the target database schema is different than the source database schema so that the middleware layer module 614 maps the data of the fields in the source database schema to the fields of the target database schema. For example, the data "email@example.com" is mapped from a label, field, or key of "email" to a key of "E". Additionally, since target database schema does not include a field for "HashCode", the "HashCode" field is not copied over to the target datastore 606. The schema 617 may be for relational databases where the source database schema would represent a row and the target database schema would represent a row.

TABLE 1

| Schemas | |
|---|---|
| Source Database Schema | Target Database Schema |
| Key: foo | Key: foo |
| Email: example@example.com | E: example@example.com |
| Phone: +1 999 0000 | P: +1 999 0000 |
| HashCode: <hash_code/> | Blank |

An indication of the entities to be copied is given to the middleware layer module 614, For example, a number of the entities to be copied, a list of entities to be copied, an indication that an entire datastore or database is to be copied, or a partition key with an indication that all the data indicated by the partition key is to be copied.

Figure 8:
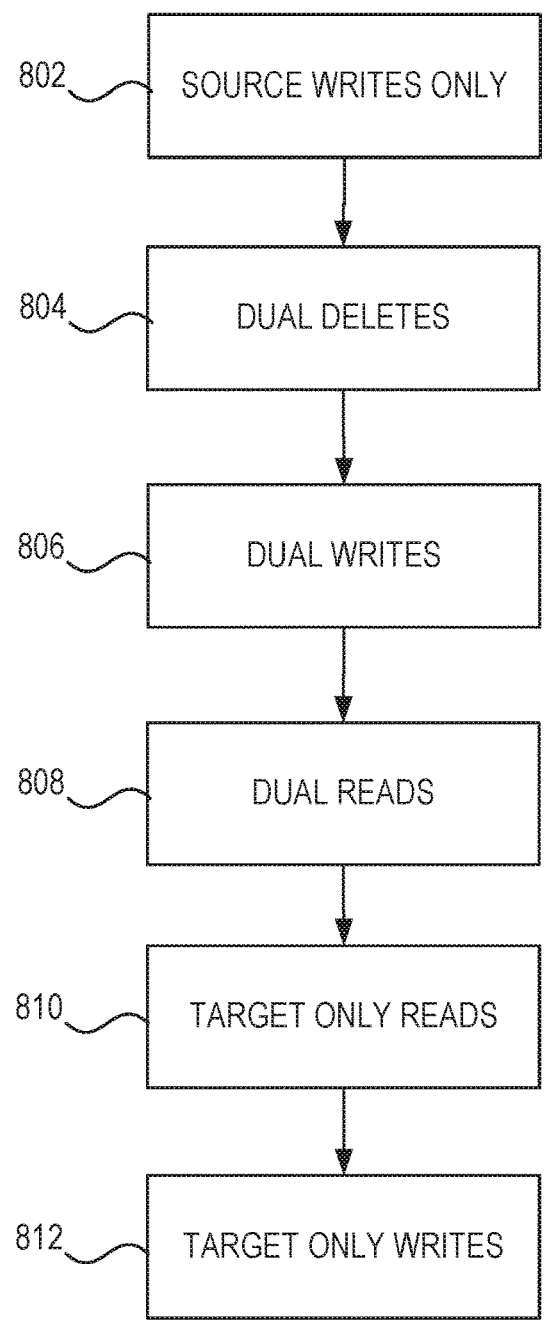
FIG. 8 illustrates states 800 of the middleware layer module in live data migration, in accordance with some examples.

The method 700 continues at operation 704 with enabling dual deletes. For example, the middleware layer module 614 begins to perform all delete operations on the source datastore 604 on the target datastore 606. This ensures that data will be deleted in target datastore 606 when it is deleted in the source datastore 604. For example, there may be a race condition, which may result in a row being copied over to the target datastore 606 and then deleted from the source datastore 604 prior to deployment of the target datastore 606 as the new datastore to use. The delete is performed in a two-phase commit manner to ensure that both deletes are performed and locked together. For example, two-phase commit module 615 is used to perform the deletes. Since each application program 608 performs all the accesses to the source datastore 604, all the deletes to the source datastore 604 are captured by the middleware layer module 614. The two-phase commit is performed by writing metadata 632, 630 to the source datastore 604 and target datastore 606, respectively. FIG. 8 is discussed in conjunction with FIG. 7.

FIG. 8 illustrates states 800 of the middleware layer module 614 in live data migration, in accordance with some examples. The states 800 start in source writes only 802 where the writes to the source datastore 604 are performed only on the source datastore 604. The states 800 move to dual deletes 804 after operation 704 of method 700. Deletes are now performed on both source datastore 604 and target datastore 606 where the data may not be in the target datastore 606.

In some examples, operation 704 is performed in a stepwise fashion where a percentage of the deletes to source datastore 604 are duplicated on the target datastore 606 to ensure that the operations are being performed correctly and that there are no performance issues. For example, there may be a latency requirement between the time the middleware layer module 614 receives a delete operation from an application program 608, 610 and a confirmation that the delete has been performed. The operation 704 may be performed on 1 percent (first percentage) of the deletes to begin to ensure that the deletes are being performed properly and that the latency of the delete confirmation has not transgressed a threshold value. The percentage of deletes is then progressively increased, e.g., 10 percent (second percentage) until 100 percent of the deletes are being performed on the source datastore 604 and the target datastore 606 where the latency delay has not transgressed a threshold and the deletes are being performed properly. For example, the second percentage of the delete operations is greater than the first percentage. If the latency does transgress a threshold duration, then the percentage of deletes is lowered until the latency does not transgress the threshold duration. The method 700 may be restarted or aborted if the latency threshold is transgressed.

The method 700 continues at operation 706 with enabling dual writing to the source datastore 604 and the target datastore 606. Data writes received from the application programs 608, 610 are performed in a two-phase commit fashion by the two-phase commit module 615. The middleware layer module 614 adjusts the write for the target partition 622 in accordance with a schema 617 for the target partition 622. In some examples, the writes are received in a generic fashion where the middleware layer module 614 adjusts or maps the writes to source datastore 604 as well as the target datastore 606. The dual writes ensure that data is not missed during the copying of the source datastore 604 to the target datastore 606 where it may be possible to miss the data from the write.

In some examples, operation 706 is performed in a stepwise fashion where a percentage of the writes to source datastore 604 are duplicated on the target datastore 606 to ensure that the operations are being performed correctly and that there are no performance issues. For example, there may be a latency requirement between the time the middleware layer module 614 receives a write operation from an application program 608, 610 and a confirmation that the write has been performed. The operation 706 may be performed on 1 percent of the writes to begin with to ensure that the writes are being performed properly and that the latency of the write confirmation has not transgressed a threshold value. The percentage of writes is then progressively increased until 100 percent of the writes are being performed on the source datastore 604 and the target datastore 606 where the latency delay has not transgressed a threshold and the writes are being performed properly. Operation 704 continues to occur with operation 706.

The method 700 continues at operation 708 with copying data from the source datastore to the destination datastore. For example, the data in the source datastore 604 is copied to the target datastore 606 using a two-phase commit module 615 to ensure that the source data does not change between the first read from the source datastore 604 and the write to the target datastore 606. The operation 708 is performed by a background process to ensure that the latency of accessing the source datastore 604 does not transgress a threshold value. The operation 708 may be suspended during heavy usage of the source datastore 604. The state 619 remains in dual writes 806 throughout operation 708. Operations 704 and 706 continue to be performed during operation 708.

The method 700 continues at operation 710 with validating the data is the same in the source and destination datastores. After operation 708 is complete and operations 704 and 706 continue to operate, the data is validated to ensure that the target datastore 606 is the same as the source datastore 604. Operations 704 and 706 ensure that during live updating that the two datastores remain the same. Operations 704 and 706 are performed with two-phase commit module 615 to ensure that deletes and writes occur simultaneously with one another in the aspect that the operation locks the data in both datastores during the transaction. The validation is performed by the validation module 621 in a background process to ensure that the latency of confirmations of performing transactions on the source datastore 604 does not transgress (e.g., becomes greater than or less than) a threshold value. The state 619 remains the same in dual writes 806. Since the dual writes and dual deletes are performed in a two-phase commit manner the two datastores will be identical except that some of the data may be locked because it is in the middle of a dual write or a dual delete. In the dual delete, the data to be deleted in the source datastore 604 and the target datastore 606 is locked with metadata 632, 630 to ensure that not only will the data be deleted in the source datastore 604 and target datastore 606 but that the data to be deleted will not be read as the metadata 632, 630 will indicate that it is in the process of being deleted. For the dual write operation, again, metadata 632, 630 is used to indicate that the data has been written to the datastore but is not yet released for use until it is written in both the source datastore 604 and the target datastore 606. The validation module 621 checks the metadata 632, 630 to determine the status of data, which may be normal or pending operation, and in pending operation the validation module 621 can check that the pending operation is the same in the target datastore 606 and the source datastore 604.

The method 700 continues at operation 712 with starting dual reading process. The middleware layer module 614 takes read operations from the application programs 608, 610 and performs the read on both the target datastore 606 and the source datastore 604 and then validates whether the data is the same. The read operations may be performed by the two-phase commit module 615 to ensure that a race condition does not occur where the data is deleted or overwritten by another write or delete operation from an application program 608, 610. The state 619 remains in dual reads 808 throughout operation 712. Additionally, operation 712 may be performed in a stepwise manner to ensure that a latency in returning the data to an application program 608, 610 from a read operation does not exceed or transgress a threshold value. The method 700 may restart if there are inconsistencies in the target datastore 606 and the source datastore 604. For example, the data read from the source datastore is compared with the data read from the target datastore and, if the comparison indicates they are different, then middleware layer module 614 determines there are inconsistencies.

The method 700 continues at operation 714 with serving destination or target datastore data. The middleware layer module 614 takes read operations from the application programs 608, 610 and performs the read on the target datastore 606. The target datastore 606 is assumed to be performing correctly after operation 712.

The method 700 continues at operation 716 with stopping writing to source datastore. The middleware layer module 614 stops or refrains from performing operation 706 in regard to writing data to the source datastore 604. At this point the source datastore 604 and target datastore 606 become different with the source datastore 604 not being current. The target datastore 606 is presumed to be correct. Operation 716 may additionally include stopping operation 704 in regard to deleting data from the source datastore 604. The state 619 moves to state target only reads 810. The state 619 additionally moves to state target only writes 812. In state 812 target only writes, the middleware layer module 614 services all requests for data such as reads, writes, and deletes to target datastore 606. The source datastore 604 is no longer current and not being accessed by the middleware layer module 614.

The method 700 continues at operation 718 with deleting the data from the source store. For example, the middleware layer module 614 deletes source datastore 604. In some examples, a person may delete the source datastore 604 to ensure that the source datastore 604 is not accidentally deleted or prematurely by the middleware layer module 614. For example, a human may want to ensure that the source datastore 604 is backed up prior to being deleted.

The method 700 may include one or more additional operations. Operations of method 700 may be performed in a different order. One or more of the operations of method 700 may be optional. The method 700 may be performed by the client device 102, messaging server system 108, and/or another device. Portions of the functionality or all of the functionality is performed on a server computer, in accordance with some examples. The method 700 may abort or resort to operation 702 if there is a problem with a dual write, dual read, or another consistency problem. The middleware layer module 614 maintains an indication of a latency to perform operations and if operations are transgressing a threshold value to perform, the method 700 suspends or aborts the live migration.

Figure 9:
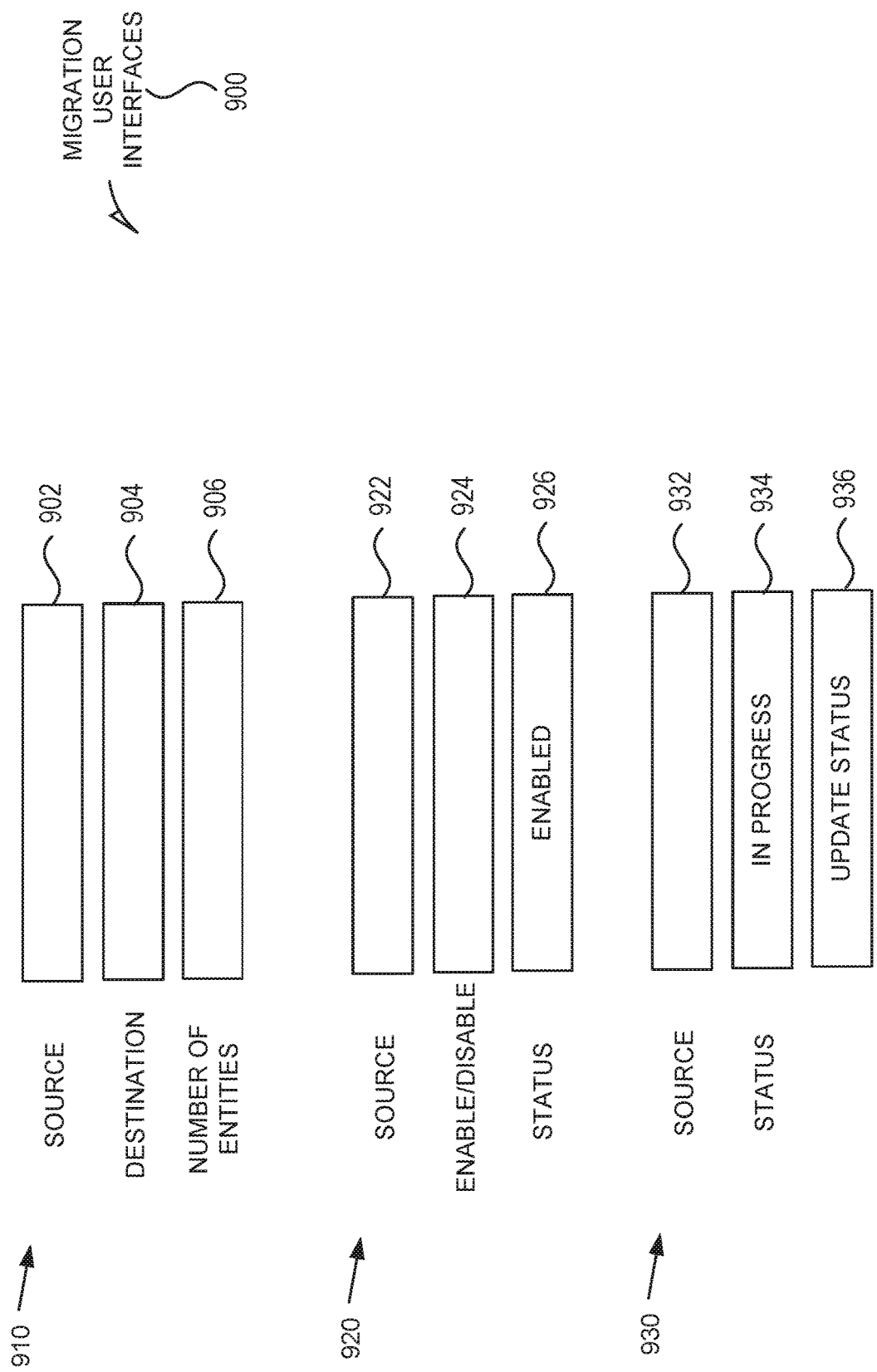
FIG. 9 illustrates migration user interfaces, in accordance with some examples.

FIG. 9 illustrates migration user interfaces 900, in accordance with some examples. The migration user interfaces 900 are presented to users by the middleware layer module 614. For example, a user of a client device 602 may invoke the middleware layer module 614 which presents one of the interfaces 910, 920, or 930. Interface 910 provides a way for entering a source 902, destination 904, and a number of entities 906 in the source 902. For example, "DFTestRootKind1" is the name of source datastore 604 and "spectacles-team-staging" is the name of the target datastore 606. Interface 910 initiates the performance of method 700 by middleware layer module 614, which is initially in a state of disabled.

Interface 920 provides a source 922, enable/disable 924, and status 926. For example, a user or program may enter "DFTestRootKind1" and status 926 indicates disabled. The user may enter "enable" at enable/disable 924 to initiate the live migration of "DFTestRootKind1" to "spectacles-team-staging". Interface 920 is used to enable or disable the live migration. The middleware layer module 614 may restart the method 700 if the live migration is disabled and then reenabled depending on the state 619 of the live migration.

Interface 930 enables a user to determine the status of a live migration. For example, a user may enter "DFTestRootKind1" into source 932 and middleware layer module 614 will cause to be displayed "in progress" at status 934 to indicate that the live migration has not completed. The "update status" user interface component 936 is used to update the status 934.

Figure 10:
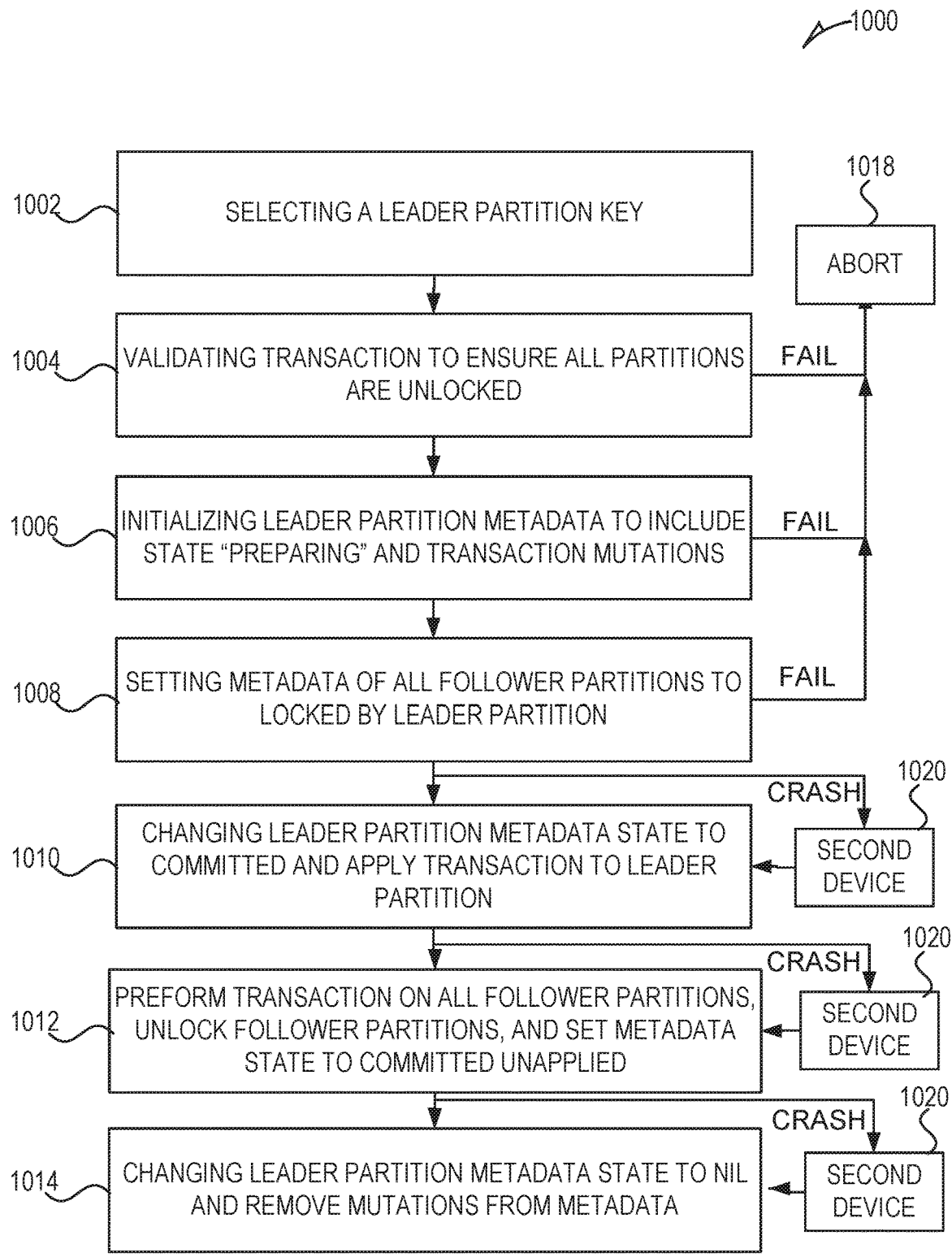
FIG. 10 illustrates a method for two-phase commit, in accordance with some examples.

FIGS. 10-12 are disclosed in conjunction with one another. FIG. 10 illustrates a method 1000 for two-phase commit, in accordance with some examples. FIG. 11 illustrates partitions 1100, in accordance with some examples. FIG. 12 is a flowchart for a method, in accordance with some examples FIG. 12 illustrates an example 1200 of method 1000, in accordance with some examples. The example illustrated in FIGS. 11 and 12 is a dual write, for example operation 706 of FIG. 7, where an application program 608, 610 has sent an operation of write to "userA:userB=Friend" with partition key 1102 of UserA and a remaining key 1104 of UserB, which has a value 1106 of "type:nil".

The method 1000 is performed by a two-phase commit module 615. The method 1000 begins with selecting a leader partition key. For example, referring to FIG. 11, partitions 1100 include two partitions source datastore 604 and target datastore 606. The two-phase transaction is to perform a write of friend to "userA:userB=Friend" to both source datastore 604 and target datastore 606 as a dual write, which is operation 706.

The partition key 1102 is used in NoSQL databases where all data related to a single person or entity is collocated and stored together. For example, a number of rows can be stored under the same partition key 1102.

The method 700 is illustrated with partition keys 1102 but one skilled in the art would recognize that other types of keys for databases or data organizations may be used where prior to accessing data, a partition key 1102 or another type of data is accessed to determine if the data is locked. Referring to FIG. 12, operation 1202, source datastore 604, target datastore 606 are illustrated along the top. Example 1200 illustrates the changes in the values of data used in method 1000 for each operation 1202.

Metadata 1211, 1218 is stored in a hidden row associated with source datastore 604 and target datastore 606, respectively. For example, for a user relationship table stored in source datastore 604 and target datastore 606, there is a separate transaction metadata for each user of the messaging system 100 that is stored alongside the relationship metadata row. The transaction metadata tells the client if there is a transaction that is in progress involving the particular partition key 1102, which is a user relationship in the example of FIGS. 11 and 12. The metadata 1211, 1218 includes enough information so that if a two-phase transaction is interrupted, for example by a device becoming inoperative, then the two-phase transaction is completed by another device. Additionally, normal access to the partitions with partition keys 1102 is modified so that before accessing data within a partition the metadata 1211, 1218 is checked to determine if the partition is locked or in the middle of a two-phase transaction. One skilled in the art will recognize that other locking mechanisms for data with storing metadata may be used.

Continuing with the example 1200, source datastore 604 is selected to have the role 1208 of leader partition key at operation 1002 and target datastore 606 is selected to have the role 1216 of follower. The roles 1208, 1216 may be implied by the values used in the metadata 1211, 1218 and/or stored locally within a module that is performing the two-phase commit, such as two-phase commit module 615. There may be more than one follower partition as a two-phase commit can include more than two transactions.

The method 1000 continues at operation 1004 with validating the transaction to ensure all partitions are unlocked. For example, the two-phase transaction includes partition key 1102 UserA and partition key 1102 UserC for source datastore 604 and target datastore 606.

The two-phase commit module 615 checks to make sure that partition key 1102 UserA and partition key 1102 UserC are not locked for source datastore 604 and target datastore 606, which may be determined by the metadata 1211, 1218, respectively. Partition UserA and partition UserC for source datastore 604 and target datastore 606 are determined not to be locked if the metadata 1211, 1218 indicates they are not locked, for example the metadata 1211, 1218 is equal to None or Nil. Additionally, the version 1209 of source datastore 604 (version=1) is stored and the version of target datastore 606 (version=10) is stored. The table of FIG. 12 is associated with the partition key UserA of source datastore 604 and target datastore 606.

The values are illustrated in example 1200 at the row with operation 1004 of the operation 1202. Each partition key 1102 and row has a version number which ensures Atomicity, Consistency, Isolation, Durability (ACID) transactions are performed with the partitions 1100. Snapshot reads of the partitions 1100 by the two-phase commit modules 615 permit concurrent modules to make progress on the two-phase transactions.

The two-phase commit module 615 reads the partitions 1100 by applying any pending transactions prior to reading data. The two-phase commit modules 615 ensure that at the time a row of partitions 1100 is read that any pending transactions are properly flushed before serving reads. This ensures that there are no pending unapplied transactions and, if so, drives those to completion. The two-phase commit module 615 ensures that all transactional read operations conform to snapshot read semantics by keeping track of the row versions 1209, 1217. If operation 1004 fails, for example, if either partition UserA of source datastore 604 or target datastore 606 is locked, then the method 1000 continues to operation 1018 with aborting the two-phase commit.

The method 1000 continues at operation 1006 with initializing leader partition metadata to include state "preparing" and the transaction mutations. For example, TransactionMetadata of partition UserA of source datastore 604 is set to "state:preparing" and "mutations:S:UserA.type=Friend;T:UserA.type=Friend", where the version 1209 remains "version=1" and "S" indicates source datastore 604 and "T" indicates target datastore 606. The versions 1209, 1217 of "1" and "10", respectively, may be stored additionally in the mutations 1212 and/or within the memory for the two-phase commit module 615. The changes are illustrated in example 1200 at the row with operation 1006 of the operation 1202. If operation 1006 fails, for example partition key 1102 UserA of source datastore 604 that is assigned the role of leader becomes locked before operation 1006 or another problem occurs, then the method 1000 continues to operation 1018 with aborting the two-phase commit.

The method 1000 continues at operation 1008 with setting metadata of all follower partitions to locked by the leader partition. For example, continuing with the example of FIGS. 11 and 12, metadata 1218 of UserA of target datastore 606 at transaction 1219 is set to "Locked:S:UserA". In some examples, the metadata 1218 may be set to "Transaction:Locked:S:UserA." The metadata 1218 includes enough information so that a module can determine that target datastore 606 UserA is locked by source datastore 604 UserA. The version 1217 number is left at 10. The changes are illustrated in example 1200 at the row with operation 1008 of the operation 1202. If operation 1008 fails, for example the metadata 1218 of target datastore 606 UserA is not nil or the version number is not the same version or has changed from the stored version such as 10, which is the stored version from operation 1004, then the method 1000 continues to operation 1018 with aborting the two-phase commit. Aborting 1018 includes resetting transaction 1219 to nil and resetting state 1210 of source datastore 604 UserA to nil. Operation 1008 may include more than one follower, for example the live migration is copying the datastore to two places, so that one follower such as target datastore 606 UserA may have metadata 1218 changed while another follower may be locked by another module or operation. Additionally, operation 1008 may be performed in parallel when there are multiple followers.

The method 1000 continues at operation 1010 with changing the leader partition metadata state to committed and applying transaction to leader partition. For example, continuing with the example of FIGS. 11 and 12, the state 1210 of source datastore UserA is set to committed. The metadata 1211 at state 1210 may be set to "state:Committed". The version 1209 of source datastore 604 UserA is updated from 1 to 2 to indicate actual values of data have changed. UserA/User:Type 1214 is set to "friend". The changes are illustrated in example 1200 at the row with operation 1010 of the operation 1202.

Additionally, if the device that is performing the method 1000 ceases to operate properly or crashes after operation 1010, then another device such as second device 1020 may continue the method 1000 to completion without any additional information using the metadata 1211, 1218 associated with source datastore 604 UserA and target datastore 606.

The method 1000 continues at operation 1012 with performing the transaction on all follower partitions and setting metadata state to committed unapplied. For example, continuing with the example of FIGS. 11 and 12, UserA/User:Type 1220 is set to "friend". The version 1217 of target datastore 606 UserA is incremented to "11" to indicate that actual data of target datastore 606 has changed. The transaction 1219 is set to nil. The changes are illustrated in example 1200 at the row with operation 1012 of the operation 1202. Additionally, if the device that is performing the method 1000 ceases to operate properly or crashes after operation 1012, then another device may continue the method 1000 to completion without any additional information using the metadata 1211, 1218 associated with source datastore 604 UserA and target datastore 606 UserA.

The method 1000 continues at operation 1014 with changing the leader partition metadata state to nil and removing mutations from the metadata. For example, continuing with the example of FIGS. 11 and 12, state 1210 is changed to nil and mutations 1212 is changed to nil. The changes are illustrated in example 1200 at the row with operation 1014 of the operations 1202. The transaction has been performed within the partitions 1100 where a dual write was performed of source datastore 604 UserA/UserC:type is set to "friend" where the current value is "typefriend_request_sent" before the write. If method 1000 is aborted or a crash occurs, then the middleware layer module 614 may attempt to recover by either completing the method 1000, restarting method 1000, or restarting the method 700. One skilled in the art would recognize that method 1000 may be used for other two-phase transactions such as a dual reads, and dual deletes.

Machine Architecture

Figure 13:
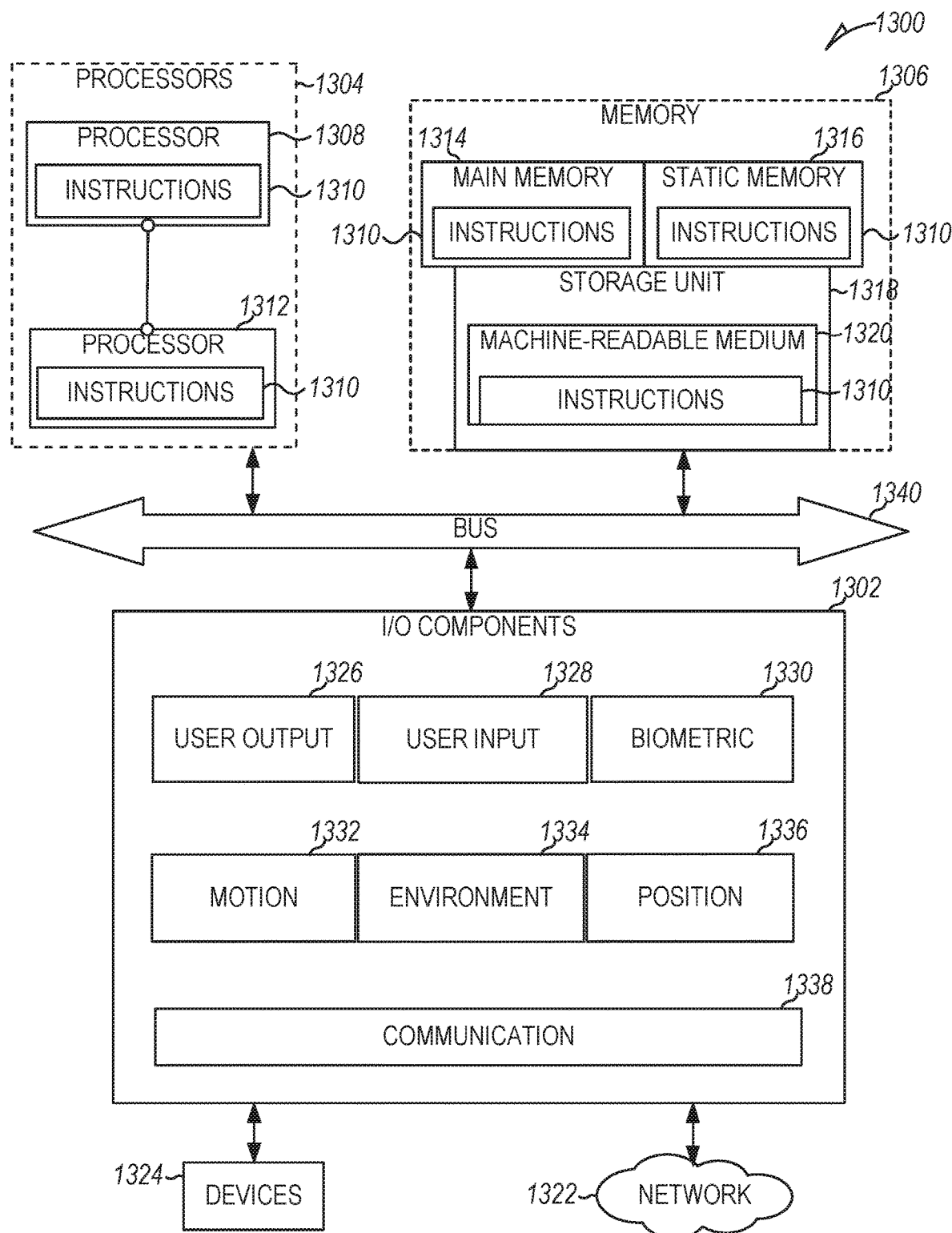
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal compute (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein. The machine 1300, for example, may comprise the client device 102 or any one of a number of server devices forming part of the messaging server system 108. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1302, which may be configured to communicate with each other via a bus 1340. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1308 and a processor 1312 that execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1314, a static memory 1316, and a storage unit 1318, both accessible to the processors 1304 via the bus 1340. The main memory 1306, the static memory 1316, and storage unit 1318 store the instructions 1310 embodying any one or more of the methodologies or functions described herein. The instructions 1310 may also reside, completely or partially, within the main memory 1314, within the static memory 1316, within machine-readable medium 1320 within the storage unit 1318, within at least one of the processors 1304 (e.g., within the Processor's cache memory), or any suitable combination thereof, during execution thereof by the machine 1300.

The I/O components 1302 may include a wide variety of components to receive input, provide output, produce output, transmit information, exchange information, capture measurements, and so on. The specific I/O components 1302 that are included in a particular machine will depend on the type of machine. For example, portable machines such as mobile phones may include a touch input device or other such input mechanisms, while a headless server machine will likely not include such a touch input device. It will be appreciated that the I/O components 1302 may include many other components that are not shown in FIG. 13. In various examples, the I/O components 1302 may include user output components 1326 and user input components 1328. The user output components 1326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1302 may include biometric components 1330, motion components 1332, environmental components 1334, or position components 1336, among a wide array of other components. For example, the biometric components 1330 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1332 include acceleration sensor components (e.g., accelerometer), gravitation sensor components, rotation sensor components (e.g., gyroscope).

The environmental components 1334 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "settles"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1336 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1302 further include communication components 1338 operable to couple the machine 1300 to a network 1322 or devices 1324 via respective coupling or connections. For example, the communication components 1338 may include a network interface Component or another suitable device to interface with the network 1322. In further examples, the communication components 1338 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1324 may be another machine or any of a wide variety of peripheral devices (e.g., a peripheral device coupled via a USB).

Moreover, the communication components 1338 may detect identifiers or include components operable to detect identifiers. For example, the communication components 1338 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1338, such as location via Internet Protocol (IP) geolocation, location via Wi-Fi® signal triangulation, location via detecting an NFC beacon signal that may indicate a particular location, and so forth.

The various memories (e.g., main memory 1314, static memory 1316, and memory of the processors 1304) and storage unit 1318 may store one or more sets of instructions and data structures (e.g., software) embodying or used by any one or more of the methodologies or functions described herein. These instructions (e.g., the instructions 1310), when executed by processors 1304, cause various operations to implement the disclosed examples.

The instructions 1310 may be transmitted or received over the network 1322, using a transmission medium, via a network interface device (e.g., a network interface component included in the communication components 1338) and using any one of several well-known transfer protocols (e.g., hypertext transfer protocol (HTTP)). Similarly, the instructions 1310 may be transmitted or received using a transmission medium via a coupling (e.g., a peer-to-peer coupling) to the devices 1324.

Software Architecture

Figure 14:
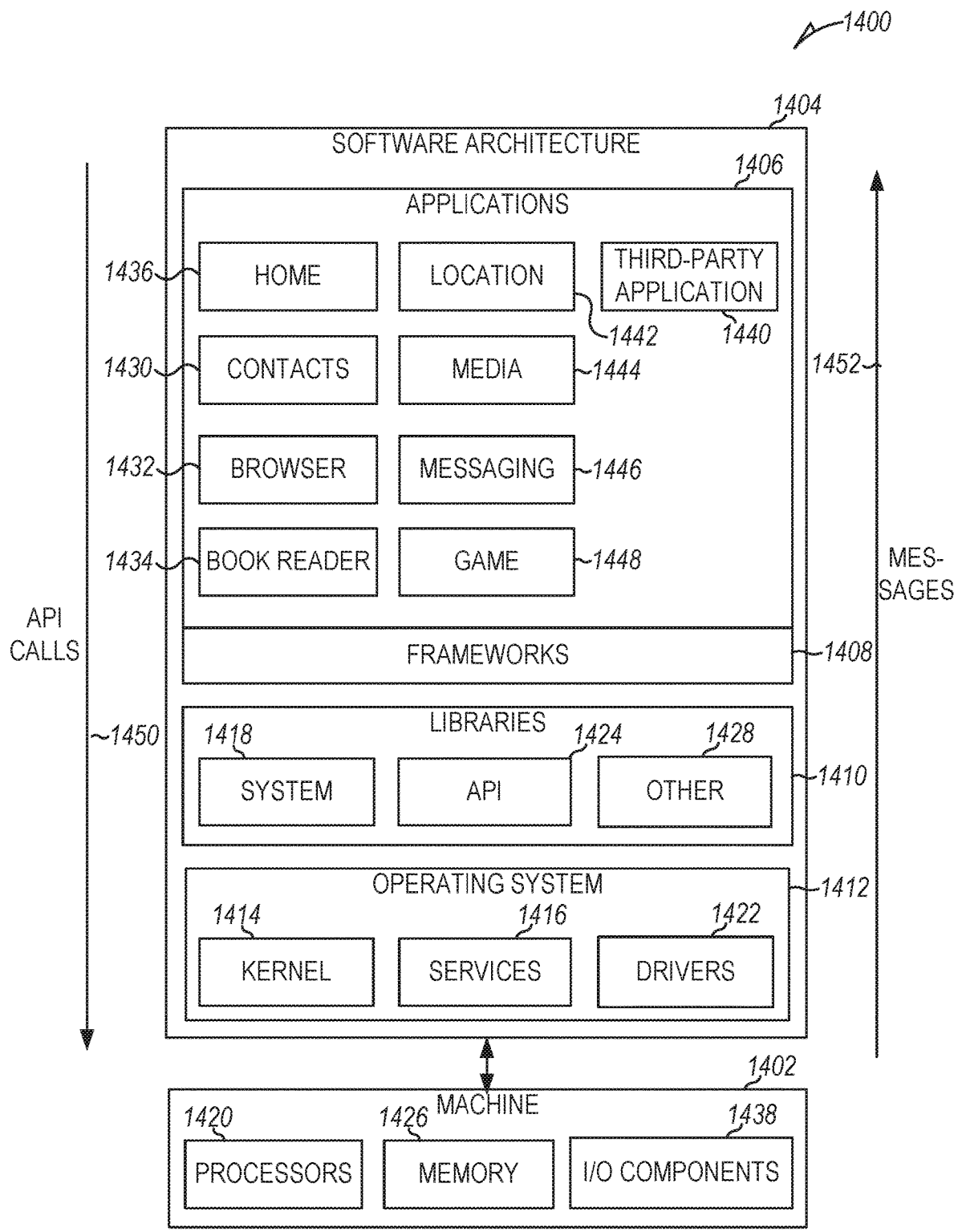
FIG. 14 is a block diagram showing a software architecture within which examples may be implemented.

FIG. 14 is a block diagram 1400 illustrating a software architecture 1404, which can be installed on any one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1410 provide a common low-level infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a common high-level infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In an example, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In a specific example, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1440 can invoke the API calls 1450 provided by the operating system 1412 to facilitate functionality described herein.

Processing Components

Figure 15:
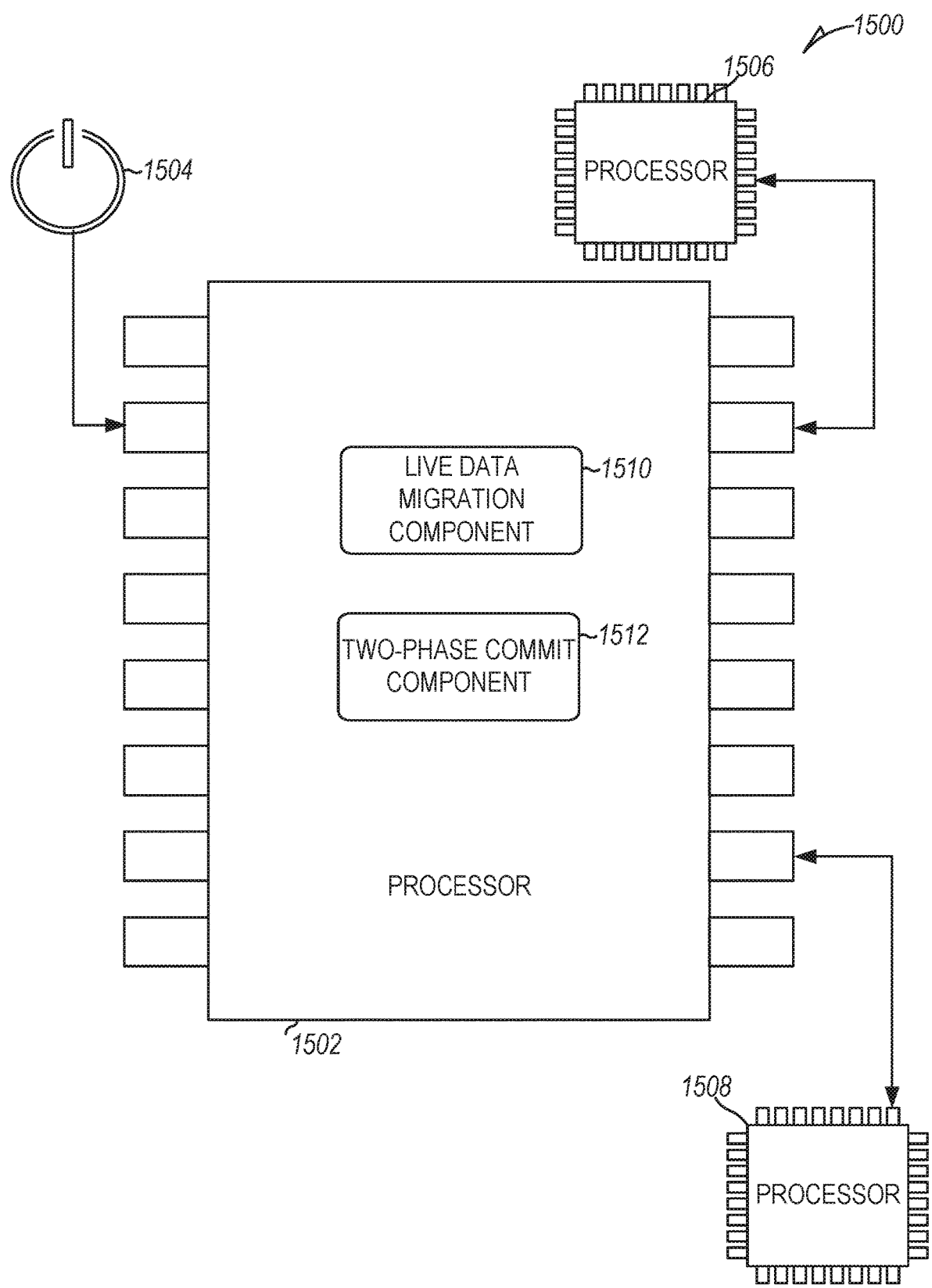
FIG. 15 is a diagrammatic representation of a processing environment, in accordance with some examples.

Turning now to FIG. 15, there is shown a diagrammatic representation of a processing environment 1500, which includes a processor 1502, a processor 1506, and a processor 1508 (e.g., a GPU, CPU or combination thereof).

The processor 1502 is shown to be coupled to a power source 1504, and to include (either permanently configured or temporarily instantiated) modules, namely a two-phase commit component 1512 and a live data migration component 1510. The two-phase commit component 1512 provides a decentralized access to partitions of data. The two-phase commit component 1512 implements the functions of two-phase commit module 615, in accordance with some examples. The two-phase commit component 1512 is configured to perform the method 1000, in accordance with some examples. The live data migration component 1510 copies data in a source datastore 604 to a target datastore 606 while maintaining a level of service to application programs 608, 610 accessing the data. The live data migration component 1510 is configured to perform method 700, in accordance with some examples.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times, Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed by a computing device, the method comprising:
   accessing a command to perform a live data migration of a source datastore to a target datastore;
   receiving a delete operation from an application program, the delete operation indicating first data to be deleted from a datastore;
   determining the datastore is stored in the source datastore;
   performing a two-phase commit delete of the first data from the source datastore and the target datastore;
   returning a confirmation to the application program that the first data has been deleted;
   determining a duration between accessing the delete operation and returning a confirmation of the delete operation;
   determining that the duration transgresses a latency threshold;
   refraining from progressing to accessing a write operation until the duration does not transgress the latency threshold;
   accessing the write operation, the write operation indicating second data to be written to the datastore;
   performing a two-phase commit write of the second data to the source datastore and to the target datastore;
   copying the source datastore to the target datastore;
   accessing a read operation, the read operation indicating third data to be read from the datastore; and
   performing the read operation of the third data from the target datastore.

2. The method of claim 1 wherein the read operation is a first read operation and wherein the method further comprises:
   before the accessing the first read operation, in response to a second read operation being received, the second read operation indicating fourth data to be read from the datastore, performing a two-phase commit read of the fourth data from the source datastore and from the target datastore;

comparing the fourth data read from the source datastore with the fourth data read from the target datastore; and
determining the target datastore is inconsistent with the source datastore when the comparing indicates the fourth data read from the source datastore is different than the target datastore.

3. The method of claim 2 further comprising:
in response to a determination that the target datastore is inconsistent, erasing the target datastore, and restarting the live data migration of the source datastore to the target datastore.

4. The method of claim 1 further comprising:
after the copying the source datastore to the target datastore, restarting the live data migration of the source datastore to the target datastore when the data in the source datastore is different than the data in the target datastore.

5. The method of claim 1 further comprising:
after the perform the read operation, refraining from writing data to the source datastore.

6. The method of claim 1 further comprising:
after the performing the read of the third data, deleting the source datastore.

7. The method of claim 1 further comprising:
determining a duration between accessing the delete operation and returning the confirmation;
determining that the duration transgresses a latency threshold; and
lowering a percentage of delete operations performed on the target datastore.

8. The method of claim 1 wherein the performing the two-phase commit delete of the first data from the source datastore and the target datastore further comprises:
writing first metadata to a partition of the source datastore, the partition comprising the first data and the first metadata comprising a state indicating preparing and mutations of the two-phase commit delete;
writing second metadata to a partition of the target datastore to indicate the partition of the target datastore is locked by the partition of the source datastore;
updating the state of the first metadata to indicate committed and performing the delete on the first data in the partition of the source datastore;
performing the delete on the first data in the partition of the target datastore and unlocking the partition of the target datastore; and
updating the first metadata to remove the mutations of the two-phase commit delete and updating the state of the first metadata to indicate the delete is completed.

9. The method of claim 8 further comprising:
after the performing the delete of the first data on the partition of the target datastore, updating the state of the first metadata to indicate committed unapplied.

10. The method of claim 9 further comprising:
storing a version of the partition of the target datastore; and
storing a version of the partition of the source datastore, and wherein the writing the first metadata to the partition of the source datastore, the first metadata comprising the state indicating preparing and the mutations of the two-phase commit delete comprises:
accessing a version of the partition of the target datastore and aborting the method if the version is not a same version as the stored version of the partition of the target datastore.

11. The method of claim 1 wherein the performing the two-phase commit write further comprises:
determine a first schema for the source datastore;
determine a second schema for the target datastore; and
mapping fields of the second data to the second schema in accordance with the first schema.

12. The method of claim 11 wherein one or more fields of the first schema are not present in the second schema and the mapping deletes the one or more fields in writing to the target datastore.

13. The method of claim 1 further comprising:
after performing the two-phase commit delete and before access the write operation,
accessing a first plurality of delete operations;
performing a first percentage of the first plurality of delete operations;
determining that a duration between performing the first percentage of the first plurality of delete operations and sending a first plurality of delete confirmation does not transgress a latency threshold;
accessing a second plurality of delete operations;
performing a second percentage of the second plurality of delete operations, the second percentage being greater than the first percentage; and
determining that a duration between performing the second percentage of the second plurality of delete operations and sending a second plurality of delete confirmation does not transgress a latency threshold.

14. A system comprising:
at least one processor; and
a memory storing instructions that, when executed by the at least one processor, configure the system to perform operations comprising:
accessing a command to perform a live data migration of a source datastore to a target datastore;
receiving a delete operation from an application program, the delete operation indicating first data to be deleted from a datastore;
determining the datastore is stored in the source datastore;
performing a two-phase commit delete of the first data from the source datastore and the target datastore;
returning a confirmation to the application program that the first data has been deleted;
determining a duration between accessing the delete operation and returning a confirmation of the delete operation;
determining that the duration transgresses a latency threshold;
refraining from progressing to accessing a write operation until the duration does not transgress the latency threshold;
accessing the write operation, the write operation indicating second data to be written to the datastore;
performing a two-phase commit write of the second data to the source datastore and to the target datastore;
copying the source datastore to the target datastore;
accessing a read operation, the read operation indicating third data to be read from the datastore; and
performing the read operation of the third data from the target datastore.

15. The system of claim 14 wherein the read operation is a first read operation and wherein the operations further comprise:
before the accessing the first read operation, in response to a second read operation being received, the second read operation indicating fourth data to be read from the datastore, performing a two-phase commit read of the fourth data from the source datastore and from the target datastore;

comparing the fourth data read from the source datastore with the fourth data read from the target datastore; and determining the target datastore is inconsistent with the source datastore when the comparing indicates the fourth data read from the source datastore is different than the target datastore.

16. A non-transitory computer-readable storage medium, the non-transitory computer-readable storage medium including instructions that when executed by at least one processor, cause the at least one processor to perform operations comprising:

accessing a command to perform a live data migration of a source datastore to a target datastore;

receiving a delete operation from an application program, the delete operation indicating first data to be deleted from a datastore;

determining the datastore is stored in the source datastore;

performing a two-phase commit delete of the first data from the source datastore and the target datastore;

returning a confirmation to the application program that the first data has been deleted;

determining a duration between accessing the delete operation and returning a confirmation of the delete operation;

determining that the duration transgresses a latency threshold;

refraining from progressing to accessing a write operation until the duration does not transgress the latency threshold;

accessing the write operation, the write operation indicating second data to be written to the datastore;

performing a two-phase commit write of the second data to the source datastore and to the target datastore;

copying the source datastore to the target datastore;

accessing a read operation, the read operation indicating third data to be read from the datastore; and performing the read operation of the third data from the target datastore.

17. The non-transitory computer-readable storage medium of claim 16 wherein the read operation is a first read operation and wherein the operations further comprise:

before the accessing the first read operation, in response to a second read operation being received, the second read operation indicating fourth data to be read from the datastore, performing a two-phase commit read of the fourth data from the source datastore and from the target datastore;

comparing the fourth data read from the source datastore with the fourth data read from the target datastore; and determining the target datastore is inconsistent with the source datastore when the comparing indicates the fourth data read from the source datastore is different than the target datastore.

\* \* \* \* \*